United States Patent Office

2,862,013
Patented Nov. 25, 1958

---

2,862,013

BRANCHED-CHAIN HIGHER ALCOHOLS FORMED BY CONDENSATION OF LOWER ALCOHOLS, AND ESTERS OF SAID HIGHER ALCOHOLS

Robert E. Miller, Dayton, Ohio, and George E. Bennett, Glendale, Mo., assignors to Monsanto Chemical Company, St. Louis, Mo., a corporation of Delaware No Drawing. Application November 16, 1955
Serial No. 547,340

1 Claim. (Cl. 260—410.9)

This invention concerns certain new compounds and methods of preparing these compounds.

The new compounds of this invention are high molecular weight branched-chain liquid alcohols containing 24 to 28 carbon atoms, and certain liquid and solid esters of these alcohols. The alcohols are 2-(tetramethylalkyl)-tetramethylalkanols in which the straight chain of the alkyl radical may be varied from hexyl through octyl as the straight chain of the alkanol is varied from decyl through dodecyl, and the 3 and 4 carbon atoms of the alkanol are methylene carbon atoms, and one hydrogen is attached to the 2-carbon atom. These alcohols are prepared by a Guerbet type condensation of lower alcohols. Fo example, the Guerbet condensation of a commercial tridecyl alcohol (a tetramethyl nonanol) produces a 2-(tetramethylheptyl)tetramethylundecane-1-ol, which may be referred to as di-tridecyl alcohol. Although the Guerbet synthesis is well known to the organic chemist, it has not been applied heretofore to such high molecular weight substituted alcohols to prepare even higher molecular weight alcohols.

The branched-chain alcohols of the invention are liquid despite their high molecular weight. They are useful as intermediates in the synthesis of plasticizers, waxes, surfactants, agricultural toxicants and lubricating oil additives.

The di-alcohols when esterified with certain acids produce esters varying from viscous liquids to solid waxes in their properties.

In the preparation of the alcohols, e. g., di-tridecyl alcohol, esters, e. g., the di-(tridecyl) tridecanoate ester, are also formed. This may occur because part of the starting alcohol is oxidized to the corresponding acid in the process, and it subsequently forms an ester with the di-alcohol product; Cannizzaro, Tischenko and Dumas-Stas type reactions could lead to ester formation. Additional acid, e. g., tridecanoic acid, may be added to the reaction mixture to promote formation of the desired ester. Various esters can also be prepared by mixing the isolated di-alcohol with the proper acid and heating the mixture in the presence of a catalyst, e. g., dilute mineral acid.

The esters of the relatively lower acids, e. g., di-(tridecyl) tridecanoate, are useful as functional fluids, especially as hydraulic fluids and heat transfer media. The unusually high viscosity of the tridecanoate makes it particularly useful in high temperature applications in which functional fluids of lower viscosity become too thin and cause leakage. This property also makes it useful in high temperature greases. Di-(tridecyl) tridecanoate also has a fairly low pour point for such a viscous material, −25° F.

High molecular weight waxes can be prepared from the di-alcohols by esterifying them with relatively higher acids, e. g., stearic acid; these waxes have properties similar to certain commercial waxes. These waxes have obvious applications in polishes and creams, wax finishes, impregnating compositions, protective coatings and as a binding agent.

The solid or liquid esters of the di-alcohols can be obtained by simple esterification procedures. Or, an ester can be obtained by applying the Guerbet reaction to an alcohol, e. g., tridecyl alcohol and isolating the resulting ester. In this application of the Guerbet reaction to an alcohol, such as tridecyl alcohol, the corresponding acid, tridecanoic acid, or another acid, e. g., stearic acid, can be added to the crude reaction product in order to form the desired ester. While esterification procedures are generally applicable to acids, those acids in the range of 12 to 18 carbon atoms, e. g., dodecanoic, tridecanoic, tetradecanoic palmitic, oleic and stearic acids, have been found desirable for present purposes, as the ester products vary from those of a functional fluid on the lower end of the range to those of a high melting point wax on the upper end of the range. The acids can have either a straight or branched chain. When using another acid such as stearic acid, it is very much preferred to isolate the di-alcohol prior to the esterification procedure.

The following examples are set forth as illustrative of the invention. While the examples set forth certain procedures for preparing the di-alcohols, it will be understood by those skilled in the art that the Guerbet reaction may be conducted with a variety of catalysts and reaction conditions. Any of these known Guerbet procedures may be used in condensing the tridecyl alcohol. Some of the Guerbet catalysts and reaction conditions, all of which are applicable, are set forth in the copending application of Robert E. Miller, Serial No. 541,053, filed October 17, 1955. Any inorganic basic substance can be used as a catalyst, alone, or along with a dehydrogenation catalyst. The term "inorganic basic substance" is used to include salts of organic acids, such as sodium acetate, as well as sodium ethoxide, sodium methoxide, etc., inorganic salts such as tripotassium phosphate, in addition to such inorganic bases as sodium hydroxide, etc., and oxides, e. g., calcium oxide. Any known dehydrogenation catalyst can be used, although metal and metal oxide catalysts are preferred, e. g., nickel, Raney nickel, palladium, copper, copper chromite, copper oxide and physical mixtures of these materials. A more complete list of applicable dehydrogenation catalysts and inorganic basic substances is set forth in the copending application of Robert E. Miller, Serial No. 541,053, filed October 17, 1955.

Of course, in order to have a Guerbet reaction it is necessary that the starting alcohol have a methylene group (—$CH_2$—) attached to the carbinol carbon atom by a single valence bond.

*Example 1*

A round-bottom flask fitted with a mechanical stirrer, thermometer and a Dean-Stark trap to which was attached a condenser, was charged with 400.5 grams (2.0 mols) of tridecyl alcohol, 26.5 grams (0.12 mol) of tripotassium phosphate, 10 grams of 1:1 copper chromite-nickel dehydrogenation catalyst and 20 cc. of toluene. The mixture was stirred and refluxed for 18 hours. The water which was removed azeotropically amounted to 14.5 cc. The reaction mixture was cooled, filtered, washed with water and extracted with ether. The ether extract was dried over sodium sulfate and distilled. The following fractions were obtained:

(1) 67.5 grams, B. P. 65–67° C./5 mm. Hg, which infrared data indicate to be an olefin, possibly $C_{26}H_{52}$.
(2) 56 grams of tridecyl alcohol, B. P. 135–160° C./5 mm.
(3) 162.0 grams of $C_{26}$ alcohol, B. P. 213–225° C./4.9 mm., $n_D^{25}$ 1.4600, $d_4^{20}$ 0.871.

(4) 14.5 grams, B. P. 255–275° C./6 mm., which infrared indicates to be an ester, the di-(tridecyl) tridecanoate ester.

The conversion to the $C_{26}$ alcohol, based upon tridecyl alcohol charged is 42.4%, and the yield, based upon reacted tridecyl alcohol, is 49.4%.

The tridecyl alcohol used in the reaction is prepared by the Oxo process. It is a mixture of primary tetramethyl nonanols with very little branching at the 2-position ("Plasticizers from Enjay Alcohols," printed February 15, 1954). As it is evident that branching on the 2-carbon atom would prevent the Guerbet reaction, the alcohol which takes part in the reaction has no branching on the 2-carbon and may be considered as a mixture of 2 - (tetramethylheptyl) - ethanols. A representative member of this group is 3,4,7,8-tetramethylnonanol, which upon reaction gives 2-(1,2,5,6-tetramethylheptyl)-5,6,9,10-tetramethylundecanol,

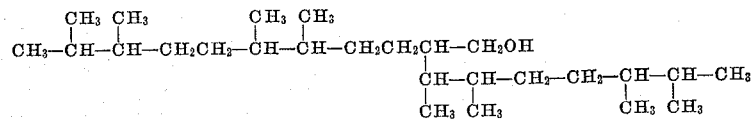

This alcohol product can also be named as a 2,4-di-(tetramethylheptyl)-butane-1-ol, and the reaction product may be considered a mixture of such butanols, or it may be named simply as 2-(tetramethylheptyl)tetramethylundecanol.

The 39-carbon atom ester product of the Guerbet reaction is the tridecanoate ester of the 2-(tetramethylheptyl)-tetramethylundecanol mixture; for simplicity it can be called di-(tridecyl) tridecanoate.

The analysis for the 26-carbon atom alcohol was:
Calc'd for $C_{26}H_{54}O$: C, 81.65; H, 14.21. Found: C, 81.97; H, 13.11; (duplicate analyses) C, 82.33; H, 13.86.

The tridecyl alcohol used in this example had a boiling point of 245–280° C. at atmospheric pressure, 84–90° C./0.5 mm., $n_D^{25}$ 1.4458, and $d_{20}^{20}$ 0.847.

*Example 2*

A mixture of 1004.0 grams (5 mols) of tridecyl alcohol (Enjay), 53.5 grams of tripotassium phosphate, 10.1 grams of 1:1 copper chromite-nickel dehydrogenation catalyst and 40 cc. of benzene was heated at 208–210° C. for 12 hours with azeotropic removal of water (18.5 cc.). Distillation gave 232.0 grams (0.68 mol) of di-tridecyl alcohol, B. P. 205–216° C./4 mm., as well as 24 grams of the tridecanoate ester. The conversion to $C_{26}H_{54}O$ was 24.5% and the yield was 85.8%.

In Examples 1, and 2 any one of the 2-(tetramethylheptyl)-1-ethanol isomers can be used in place of a mixture of them, including those containing more than one methyl substituent on one carbon atom. Moreover, dodecyl alcohol, a mixture of 2-(tetramethylhexyl)-1-ethanols, or any one of such isomers can be substituted in Examples 1 and 2 to prepare the corresponding di-dodecyl alcohol and di-(dodecyl) dodecanoate; similarly tetradecyl alcohol, i. e., a mixture of 2-(tetramethyloctyl)-1-ethanol isomers, or any one of such isomers can be substituted in the procedure of Examples 1 and 2 in order to prepare the corresponding di-tetradecyl alcohol, or di-(tetradecyl) tetradecanoate.

A partial list of the 2-(tetramethylhexyl)-, 2-(tetramethylheptyl)-, and 2-(tetramethyloctyl)-ethanols, all of which can be used individually in the procedure of Examples 1 and 2 is as follows: 3,4,5,6-tetramethylnonanol, 3,4,5,6 - tetramethyloctanol, 3,4,5,6 - tetramethyldecanol, 3,5,6,7 - tetramethyloctanol, 3,5,6,7 - tetramethylnonanol, 3,5,6,7 - tetramethyldecanol, 3,6,7,8 - tetramethylnonanol, 3,6,7,8 - tetramethyldecanol, 3,7,8,9 - tetramethyldecanol, 4,5,6,7 - tetramethyloctanol, 4,5,6,7 - tetramethylnonanol, 4,5,6,7 - tetramethyldecanol, 4,6,7,8 - tetramethylnonanol, 4,7,8,9 - tetramethyldecanol, 5,6,7,8 - tetramethylnonanol, 5,6,7,8 - tetramethyldecanol, 6,7,8,9 - tetramethyldecanol, 3,3,5,6 - tetramethyloctanol, 3,3,4,7 - tetramethylnonanol, 4,4,5,5 - tetramethyldecanol, 5,5,7,8 - tetramethyldecanol, 3,4,7,7-tetramethyloctanol, etc. Each of this group of alcohols gives the desired Guerbet reaction, and the products are alcohols having twice the number of carbon atoms of the starting alcohol, and possessing properties similar to those of the alcohol product of Examples 1 and 2. The ester of the di-alcohol and the acid resulting from oxidation of the original alcohol, are also formed. The stearate esters of all of the alcohol products have properties similar to the di-(tridecyl) stearate wax formed from di(tridecyl alcohol) and stearic acid.

It does not appear necessary to list the di-alcohols formed by condensation of the listed alcohols, as, in every case the condensation takes place by the Guerbet mechanism to give an alcohol having twice the number of carbon atoms of the original alcohol. However, a few of the alcohols which can be formed are: 2-(1,2,5,6-tetramethyloctyl) - 5,6,9,10 - tetramethyldodecane - 1 - ol, 2 - (1,3,5,5 - tetramethylhexyl) - 5,7,9,9 - tetramethyldecanol, 2 - (2,2,3,3 - tetramethyloctyl) - 6,6,7,7 - tetramethyldodecanol, etc.

The reaction of a mixture of isomers produces a mixture of products, e. g., 3,5,6,7-tetramethylnonanol and 3,6,7,8-tetramethylnonanol give the two self-condensation products, as well as the 2-(1,3,4,5-heptyl)-5,8,9,10-undecanol and 2-(1,4,5,6-heptyl)-5,7,8,9-undecanol isomers. The reaction of mixtures of the alcohols gives mixtures of condensates, e. g., a mixture of dodecyl- and tetradecyl alcohols gives the products of self-condensation as well as 2-(tetramethylhexyl)-tetramethyldodecanols and 2-(tetramethyloctyl)-tetramethyldecanols.

The new compounds of this invention can be defined as 2,4-di-(tetramethylalkyl)-butanols in which the alkyl groups have 6 to 8 carbon atoms in a straight chain and in which the two tetramethylalkyl groups can be the same or different.

In the Guerbet reaction of these viscous high molecular weight alcohols, the addition of a small amount of an inert, more volatile liquid to the reaction mixture has been found particularly advantageous in promoting a smooth reaction and improving results. It is believed that this addition improves results by aiding in agitation of the viscous mixture, and accelerating the removal of water from the mixture. Any inert water-immiscible liquid having a boiling point of about 60° to 150° C. or the like can be used, e. g., benzene, toluene, heptane, octane, dodecane, etc., or other hydrocarbon or unreactive solvents. If such solvent is used, the amount may be varied considerably, as from any substantial amount, e. g., 2% by weight based upon the alcohol, to much larger amounts, e. g., 50% or more by weight of the reaction mixture. Small amounts, such as 5% based on the alcohol have been found convenient.

While only certain ester products have been specifically mentioned, it will be appreciated that other esters are also formed in the reaction. For example part of the di-tridecyl alcohol product can be oxidized to a $C_{26}$ acid which can then form an ester with the starting tridecyl alcohol or with some of the di-tridecyl alcohol product. The reaction can be conducted to promote formation of such other esters.

The starting alcohols used in the procedure of this invention are readily available commercial alcohols formed by the oxonation of $C_{11}$ to $C_{13}$ olefin polymers resulting from the polymerization of propylene, isobutylene and combinations of such monomers. For example, triisobutylene or tetrapropylene can be oxonated to a tridecyl alcohol. The Oxo process is reviewed in "Bureau of Mines Report of Investigations 4270."

Although the starting tetramethylalkanols can have two methyl substituents on one carbon atom, alcohols having the methyl substituents on different carbon atoms can be used, there being no more than one methyl substituent on any one carbon atom; i. e., alcohols having no quaternary carbon atoms can be used, there will be no quaternary carbon atoms in the products.

*Example 3*

A mixture of 410 grams of commercial tridecyl alcohol, 26.5 grams of tripotassium phosphate, 10 grams of 1:1 copper chromite-nickel dehydrogenation catalyst and 40 cc. of toluene were heated for 12 hours at 206–208° C. Distillation gave 122.5 grams of di-tridecyl alcohol of B. P. 200–205° C./3.5 mm., $n_D^{25}$ 1.4588. The conversion is 32% and the yield is 67.8%.

The residue was distilled to give 31.0 grams of the tridecanoate ester, B. P. 284–304° C./4 mm., $n_D^{25}$ 1.4652; $d_4^{20}$ 0.885.

*Analysis.*—Calc'd. for $C_{39}H_{78}O_2$: C, 81.21; H, 13.52. Found: C, 82.94; H, 14.07.

The di-(tridecyl) tridecanoate had the following properties:

Viscosity index_____ +64.
Viscosity_____ 107.6 centigram seconds at 100° F.
Pour point_____ −25° F.
Fire point_____ 575° F.
Flash point_____ 400° F.

It will be appreciated that this functional fluid has a high viscosity at 100° F.

*Example 4*

Di-tridecyl alcohol (20 grams) having a boiling point of 205–213° C./4.9 mm. was heated under reflux with 20 grams of stearic acid and 40 cc. benzene, while removing water azeotropically as formed. As esterification catalyst, 1.2 grams of p-toluenesulfonic acid was used. After 6 hours 0.5 cc. of water had collected. The mixture was washed with dilute $Na_2CO_3$ solution, the benzene evaporated and the resulting precipitate filtered. The solids were taken up in 2000 ml. of hot ethanol and filtered. The filtrate was cooled to give a precipitate which was filtered and dried. The 16.3 gram product was a pure white wax having a melting range of 184–194° C.

Other acids, for example tridecanoic, dodecanoic, tetradecanoic, oleic, palmitic, etc., can be used in the esterification procedure of Example 4. Of course, the liquid esters formed from some of the foregoing acids can be separated by distillation rather than the crystallization procedure of Example 4.

In place of the toluenesulfonic acid of Example 4, any other esterification catalyst may be used. The preferred esterification catalysts are mineral acids, for example, hydrochloric acid, sulfuric acid, phosphoric acid, etc. Alkaline materials, such as the Guerbet type catalysts, can also cause formation of the esters, but these materials also cause hydrolysis of the esters, so that yields with alkaline catalysts are generally inferior to those with acid catalysts. However, alkaline materials, e. g., sodium hydroxide or sodium methoxide can be considered esterification catalysts in the sense that esters can be formed in their presence.

The reaction temperature in the Guerbet condensation may vary greatly, depending on the particular catalyst, the reaction time and other factors. In general, temperatures of 150° C. or higher are desirable. However, temperatures of 125° to 300° C. have been found satisfactory. A convenient way of carrying out the reaction is to maintain the mixture of reactants and inert solvent under reflux at atmospheric pressure. The reaction time depends on the catalyst and reaction temperature. The time can vary from 3 to 25 hours for a batch reaction. Ordinarily, the time required for a continuous flow type of reaction is less than that for a batch reaction. The reaction can be conducted under autogenous pressure, pressure of various gases, or at atmospheric pressure as understood by those skilled in the art.

The catalysts can be used in any catalytic amounts. For example, 1 to 20 parts by weight of inorganic basic substance per 100 parts by weight of alcohols is usually suitable and the dehydrogenation catalyst can be present in similar amounts if it is used at all; from 1 to 5 parts by weight of the dehydrogenation catalyst per 100 parts by weight of alcohols is usually suitable.

A new class of high molecular weight branched-chain alcohols has been prepared, and a new class of esters of such alcohols has been prepared. Methods of preparing such alcohols and esters have been set forth.

As different embodiments of this invention may be made without departing from the spirit and scope thereof, it is to be understood that the invention is not limited to the specific embodiments set forth.

We claim:

The esters of 2,4-di-(tetramethylheptyl)-butane-1-ol and 2-(tetramethylheptyl)-ethan-1-oic acid, characterized by viscosity index of +64, viscosity at 100° F. of 107.6 centigram seconds, and pour point of −25° F.

References Cited in the file of this patent

UNITED STATES PATENTS

| | | |
|---|---|---|
| 2,757,139 | Matuszak et al. | July 31, 1956 |
| 2,762,847 | Miller et al. | Sept. 11, 1956 |

FOREIGN PATENTS

| | | |
|---|---|---|
| 884,829 | France | Aug. 27, 1943 |
| 655,864 | Great Britain | Aug. 1, 1951 |

OTHER REFERENCES

Wagner et al.: Synthetic Organic Chemistry, 1953, p. 181, reaction 111.